US008477132B2

(12) United States Patent
Seo et al.

(10) Patent No.: US 8,477,132 B2
(45) Date of Patent: Jul. 2, 2013

(54) DEVICE AND METHOD FOR DRIVING IMAGE DISPLAY DEVICE

(75) Inventors: Byung-Hyun Seo, Paju-si (KR); Hui Kim, Seoul (KR); Kuk-Hui Chang, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 235 days.

(21) Appl. No.: 13/112,522

(22) Filed: May 20, 2011

(65) Prior Publication Data

US 2011/0292028 A1 Dec. 1, 2011

(30) Foreign Application Priority Data

May 25, 2010 (KR) ........................ 10-2010-0048611

(51) Int. Cl.
*G06F 3/038* (2006.01)

(52) U.S. Cl.
USPC .......................................... 345/213; 345/204

(58) Field of Classification Search
None
See application file for complete search history.

(56) References Cited

U.S. PATENT DOCUMENTS

| | | | | |
|---|---|---|---|---|
| 5,987,543 | A * | 11/1999 | Smith | 710/70 |
| 6,373,527 | B1 * | 4/2002 | Lee | 348/564 |
| 7,221,353 | B2 * | 5/2007 | Kim et al. | 345/102 |
| 2008/0231578 | A1 * | 9/2008 | Johnson et al. | 345/98 |

* cited by examiner

*Primary Examiner* — Jason Olson
(74) *Attorney, Agent, or Firm* — McKenna Long & Aldridge LLP

(57) ABSTRACT

A device for driving an image display device that includes an image display panel, a plurality of drivers for driving the image display panel, a Low Voltage Differential Signaling (LVDS) transmission unit for converting external image data and a plurality of control signals including frame ratio setting signals into LVDS signals and transmitting the same, an LVDS reception unit for converting the image data and the plurality of control signals including frame ratio setting signals OP1, OP1 converted into the LVDS signals and transmitted thus into TTL signals and forwarding the same, and a timing controller for aligning the image data to fit to the display frame ratio according to the frame ratio setting signal and the plurality of control signals from the LVDS reception unit and supplying the same to the plurality of drivers, for displaying the image on the image display panel.

8 Claims, 5 Drawing Sheets

DEVICE AND METHOD FOR DRIVING IMAGE DISPLAY DEVICE

CROSS REFERENCE TO RELATED APPLICATION

This application claims the benefit of the Korean Patent Application No. 10-2010-0048611, filed on May 25, 2010, which is hereby incorporated by reference as if fully set forth herein.

BACKGROUND OF THE DISCLOSURE

1. Field of the Disclosure

The present invention relates to image display devices, and more particularly to a device and method for driving an image display device in which additional transmission of control signals is made available without increasing signal transmission lines in an Low Voltage Differential Signaling (LVDS) interface circuit.

2. Discussion of the Related Art

Recently, in order to produce a more satisfactory image, the image display device is developed to produce an image of high frequency and high resolution.

Accordingly, image data or control signals are also transmitted by using the LVDS interface in which the image data or the control signals are converted into LVDS signals before transmission. In detail, in the LVDS interface, a Transistor-Transistor Logic (TTL) signal is converted into the LVDS signal before supply of the TTL signal, and the LVDS signal is converted into the TTL signal again before timing formatting. The image data or control signals formatted thus can be supplied to a separate control integrated circuit or a drive integrated circuit.

The image data which is supplied to the image display panel to display the image can be an 8 bit data on each of three colors, i.e., red R, green G, and blue B colors. In this case, the three color image data each having 8 bits are transmitted in response to control signals of a horizontal synchronizing signal (Hsync), a vertical synchronizing signal (Vsync), a data enable signal (DE), and a clock signal (CLK) through at least four lines of TTL signal lines and buffers.

Recently, various user convenience matters are applied to the image display device according to demands from users. In order to apply the various user convenience matters, more control singles are required to be supplied to the image display device. For example, in order to allow the user to convert a display frame ratio of the image in a variety of ratios, since it is required to convert a variety of control signals matched to the variety of ratios into the LVDS signals and supply of the same, numbers of the TTL signal transmission lines and respective buffers are increased.

However, if the TTL signal transmission lines and respective buffers are increased according to the user's demands, the LVDS interface circuit becomes complicated and requires a cost increase for applying this. Accordingly, it is a recent situation in which methods are required for transmitting more control signals without increase of the TTL signal transmission lines.

SUMMARY OF THE DISCLOSURE

Accordingly, the present invention is directed to a device and method for driving an image display device.

An object of the present invention is to provide a device and method for driving an image display device in which additional transmission of control signals is made available without increasing signal transmission lines of LVDS interface circuit.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a device for driving an image display device includes an image display panel having a plurality of pixels for displaying an image, a plurality of drivers for driving the image display panel, an LVDS transmission unit for converting an external image data and a plurality of control signals including frame ratio setting signals into LVDS signals and transmitting the same, a LVDS reception unit for converting the image data and the plurality of control signals including frame ratio setting signals converted into the LVDS signals and transmitted thus into TTL signals and forwarding the same, and a timing controller for aligning the image data to fit to the display frame ratio according to the frame ratio setting signals and the plurality of control signals from the LVDS reception unit and supplying the same to the plurality of drivers, for displaying the image on the image display panel.

The LVDS transmission unit converts 30 bits of the image data, 1 bit of a horizontal synchronizing signal, 1 bit of a vertical synchronizing signal, and 1 bit of a data enable signal, and 2 bits of the frame ratio setting signals into an LVDS signal format and transmits the same as 1 port LVDS data on one pixel, and the LVDS reception unit converts the 1 port LVDS data on one pixel into the TTL signals which are the 30 bits of the image data, 1 bit of a horizontal synchronizing signal, 1 bit of a vertical synchronizing signal, and 1 bit of a data enable signal, and 2 bits of the frame ratio setting signals and supplying the same to the timing controller.

The LVDS transmission unit includes a TTL-TO-LVDS converter, a Phase Locked Loop (PLI), and first to fourth buffers, for receiving the 30 bits of the image data through 30 TTL transmission lines, and the frame ratio setting signal, the horizontal synchronizing signal, the vertical synchronizing signal, and the data enable signal through 5 TTL signal transmission lines, and transmitting the image data and the control signals including the frame ratio setting signals converted into the LVDS signals thus to the LVDS reception unit through first to third buffers provided to three output terminals on the TTL-TO-LVDS converter.

The LVDS reception unit includes the LVDS-TO-TTL converter and a second PLL and fifth to eighth buffers for receiving the one port LVDS signals on one pixel through the fifth to seventh buffers provided to three input terminals on the LVDS-TO-TTL converter, for converting the one port LVDS signals on one pixel into TTL signals of 30 bits of the image data, 1 bit of a horizontal synchronizing signal, 1 bit of a vertical synchronizing signal, and 1 bit of a data enable signal, and 2 bits of the frame ratio setting signals and supplying the same to the timing controller.

In another aspect of the present invention, a method for driving an image display device includes the steps of converting an external image data and a plurality of control signals including frame ratio setting signals into LVDS signals and transmitting the same, converting the image data and the plurality of control signals including the frame ratio setting signals converted into the LVDS signals and transmitted thus into TTL signals and forwarding the same, and aligning the image data to fit to the display frame ratio according to the frame ratio setting signal and the plurality of control signals and supplying the same to a plurality of drivers, for displaying the image on the image display panel.

The step of converting the image data and the plurality of control signals including the frame ratio setting signals converted into the LVDS signals and transmitted thus into TTL signals and forwarding the same includes; the step of converting 30 bits of the image data, 1 bit of a horizontal synchronizing signal, 1 bit of a vertical synchronizing signal, and 1 bit of a data enable signal, and 2 bits of the frame ratio setting signals into an LVDS signal format and transmitting the same as 1 port LVDS data on one pixel, and the step of aligning the image data to fit to the display frame ratio according to the frame ratio setting signal and the plurality of control signals and supplying the same to a plurality of drivers, for displaying the image on the image display panel includes; the step of receiving and converting the 1 port LVDS data on one pixel transmitted thus into the TTL signals which are the 30 bits of the image data, 1 bits of a horizontal synchronizing signal, 1 bit of a vertical synchronizing signal, and 1 bit of a data enable signal, and 2 bits of the frame ratio setting signals.

The step of converting the image data and the plurality of control signals including the frame ratio setting signals converted into the LVDS signals and transmitted thus into TTL signals and forwarding the same includes; the step of using a LVDS-TO-TTL converter, a PLL, and first to fourth buffers, for receiving the 30 bits of the image data through 30 TTL transmission lines, and the frame ratio setting signal, the horizontal synchronizing signal, the vertical synchronizing signal, and the data enable signal through 5 TTL signal transmission lines, and transmitting the image data and the control signals including the frame ratio setting signal converted into the LVDS signals thus to the LVDS reception unit through first to third buffers provided to three output terminals on the TTL-TO-LVDS converter.

The step of aligning the image data to fit to the display frame ratio according to the frame ratio setting signal and the plurality of control signals and supplying the same to a plurality of drivers, for displaying the image on the image display panel includes; the step of providing the LVDS-TO-TTL converter, a second PLL and fifth to eighth buffers, for receiving the one port LVDS signals on one pixel through the fifth to seventh buffers provided to three input terminals on the LVDS-TO-TTL converter, and converting the one port LVDS signals on one pixel into TTL signals of 30 bits of the image data, 1 bits of a horizontal synchronizing signal, 1 bit of a vertical synchronizing signal, and 1 bit of a data enable signal, and 2 bits of the frame ratio setting signals and forwarding the same.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DESCRIPTION OF SPECIFIC EMBODIMENTS

Reference will now be made in detail to the specific embodiments of the present invention, examples of which are illustrated in the accompanying drawings. Wherever possible, the same reference numbers will be used throughout the drawings to refer to the same or like parts.

In this instance, for convenience's sake, though the image display device can be a liquid crystal display device, a field emission display device, a plasma display panel, or a light emitting display device, the image display device of the present invention will be described taking the liquid crystal display device as an example.

Figure 1:
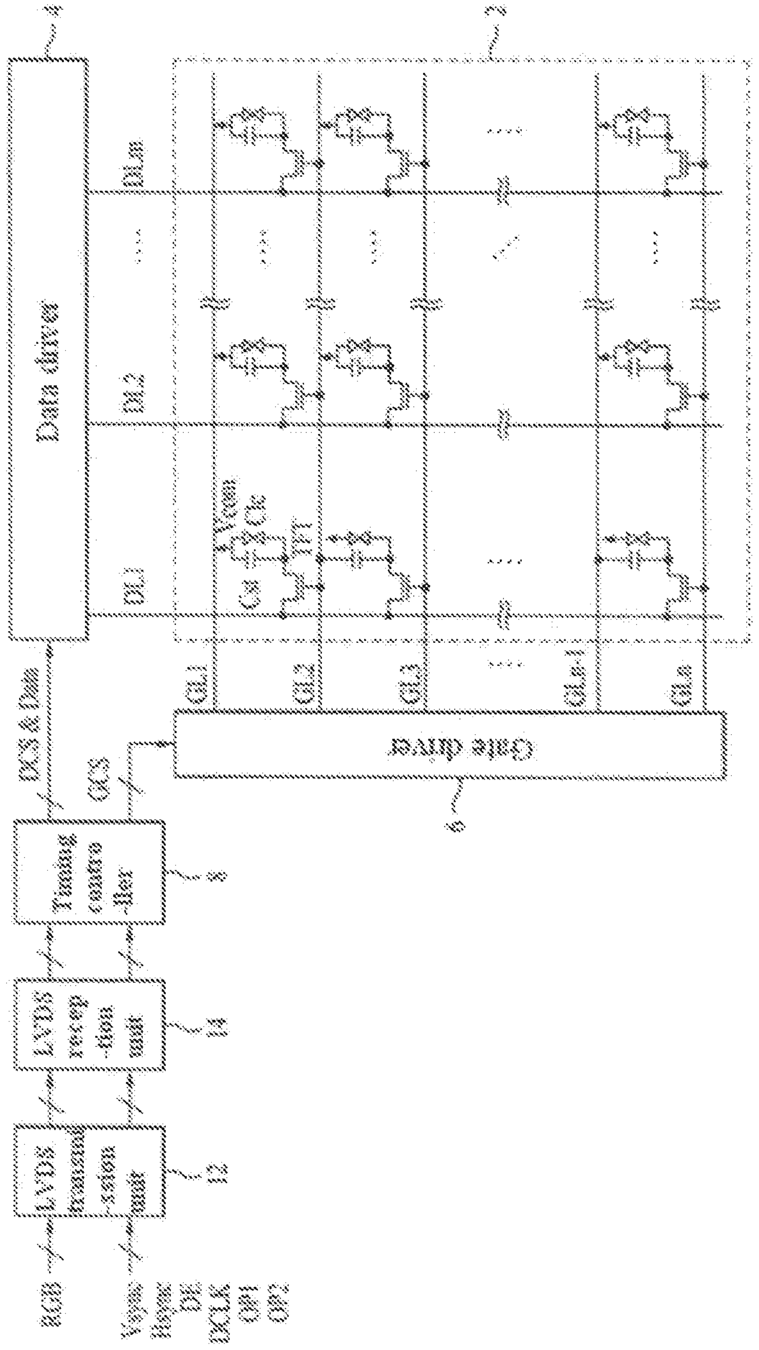
FIG. 1 illustrates a block diagram of a device for driving a liquid crystal display device in accordance with a preferred embodiment of the present invention.

FIG. 1 illustrates a block diagram of a device for driving a liquid crystal display device in accordance with a preferred embodiment of the present invention.

Referring to FIG. 1, the liquid crystal display device includes a liquid crystal panel 2 having a plurality of pixels for displaying an image, a plurality of drivers for driving the liquid crystal panel 2, an LVDS transmission unit 12 for converting an image data RGB received from an external system and a plurality of control signals Vsync, Hsync, DE, and DCLK including frame ratio setting signals OP1, OP2 into LVDS signals and transmitting the same, an LVDS reception unit 14 for converting the image data RGB and the plurality of control signals Vsync, Hsync, DE, and DCLK including the frame ratio setting signals OP1, OP2 converted into the LVDS signals into TTL signals and forwarding the same, and a timing controller 8 for aligning the image data RGB to fit to a display frame ratio according to the plurality of control signals Vsync, Hsync, DE, and DCLK including the frame ratio setting signals OP1, OP2 and supplying the same to the plurality of drivers for making the image displayed on the liquid crystal panel 2.

The liquid crystal panel 2 includes thin film transistors TFT each formed at a pixel region defined by a plurality of gate lines GL1~GLn and a plurality of data lines DL1~DLm, and a liquid crystal capacitor Clc connected to the TFT. The liquid crystal capacitor Clc has a pixel electrode connected to the TFT, a common electrode facing the pixel electrode with the liquid crystals disposed therebetween. The TFT supplies the image signal from each of the data lines DL1~DLm to the pixel electrode in response to a scan pulse from each of the gate lines GL1~GLn. The liquid crystal capacitor Clc has a difference of a voltage of the image signal supplied to the pixel electrode and a common voltage supplied to the common electrode charged therein, and varies an orientation of liquid crystal molecules with the difference of voltages, to control light transmissivity to produce gradients. And, the liquid crystal capacitor Clc has a storage capacitor Cst connected thereto in parallel for sustaining a voltage charged in the liquid crystal capacitor Clc until a next data signal is supplied. The storage capacitor Cst is formed as the pixel electrode is overlapped with a prior gate line with an insulating film disposed therebetween. Different from this, the storage capacitor Cst can be formed as the pixel electrode is overlapped with a storage line with the insulating film disposed therebetween.

The plurality of drivers which drive the liquid crystal panel 2 can be at least one data driver 4 and gate driver 6. The data driver 4 converts the data aligned thus at the timing controller 8 into an analog voltage, i.e., an image signal, by using data control signals DCS from the timing controller 8, for an example, a source start pulse SSP, a source shift clock SSC, a source output enable signal. In detail, the data driver 4 latches the data gamma converted and aligned at the timing controller 8 in response to the SSP, and supplies one horizontal line portion of the image signal to each of the data lines DL1~DLm at every horizontal period in which the scan pulse is supplied to each of the gate lines GL1~GLn in response to the SOE signal. In this instance, the data driver 4 selects a positive or a negative gamma voltage having a predetermined level according to a gradient of the data aligned thus and supplies the gamma voltage selected thus to each of the data lines DL1~DLm as the image signal.

The gate driver 6 generates the scan pulses in succession in response to gate control signals (GCS) from the timing controller 8, for an example, a gate start pulse (GSP), a gate shift clock (GSC), a gate output enable (GOE) signal, and supplies the same to the gate lines GL1~GLn in succession. That is, the gate driver 6 shifts the GSP from the timing controller 8 according to the GSC and supplies the scan pulses, for an example, gate on voltages, to the gate lines GL1~GLn in succession. And, in a period in which no gate on voltage is supplied to the gate lines GL1~GLn, the gate driver 6 supplies the gate off voltage to the gate lines GL1~GLn. In this instance, the gate driver 6 controls a pulse width of the scan pulse according to the GOE signal.

The timing controller 8 sets and aligns a display frame ratio of the image data RGB according to the frame ratio setting signals OP1, OP2 received from the LVDS reception unit 14 and supplies the same to the data driver 4. For an example, if the frame ratio setting signals OP1, OP2 are set to display an image in a ratio of 16:9 which is a frame display ratio of a general frame according to a user's selection, the timing controller 8 aligns the image data RGB to fit to a size and drive of the liquid crystal panel 2 to display the image in the ratio of 16:9. Then, the timing controller 8 supplies the image data aligned thus to the data driver 4. If the frame ratio setting signals OP1, OP2 are set to display an image in a ratio of 21:9 which is a frame display ratio at the time of a movie show according to a user's selection, the timing controller 8 aligns the image data RGB to display the image in the ratio of 21:9, and supplies the image data to the data driver 4.

And, the timing controller 8 generates the gate and data control signals GSC and DCS by using at least one of synchronizing signals, i.e., a dot clock DCLK, a data enable signal DE, horizontal and vertical synchronizing signals Hsync and Vsync, and supplies the same to the gate and data drivers 6 and 4 respectively, to control the gate and data drivers 6 and 4.

Figure 2:
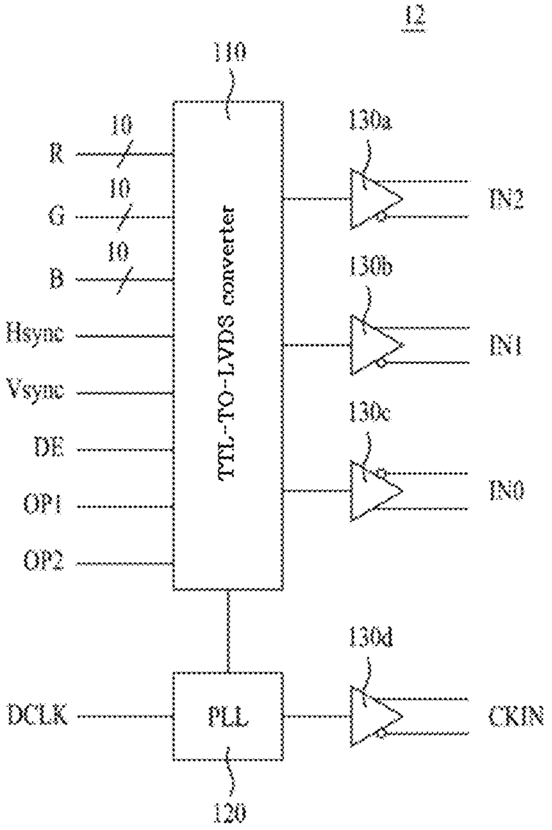
FIG. 2 illustrates a block diagram of the LVDS transmission unit in FIG. 1.

FIG. 2 illustrates a block diagram of the LVDS transmission unit in FIG. 1.

Referring to FIG. 2, the LVDS transmission unit converts the image data RGB received from the external system and the plurality of control signals Vsync, Hsync, DE, and DCLK including the frame ratio setting signal OP1, OP2 into LVDS signals and transmits the same to the LVDS reception unit 14.

In a step for converting the TTL signal into the LVDS signal, the image data supplied to the image display panel to display the image can be 10 bit data of each of three colors, i.e., red R, green G, and blue B colors. In this case, the 10 bit data of each of the three colors are applied to a TTL-TO-LVDS converter 110 in the LVDS transmission unit 12 through 30 TTL signal transmission lines.

And, the control signals of the frame ratio setting signals OP1, OP2, the horizontal synchronizing signal Hsync, the vertical synchronizing signals Vsync, the data enable signal DE, and the dot clock DCLK are applied to the TTL-TO-LVDS converter 110 through 6 or more than 6 TTL signal transmission lines, and, among above signals, the dot clock DCLK is applied to a first phase locked loop (a first PLL) 120.

The first PLL 120 is configured to provide a reference clock for operating the TTL-TO-LVDS converter 110, and the reference clock is one synchronized to the received dot clock. The TTL-TO-LVDS converter 110 converts the TTL signal into the LVDS signal by using the reference clock, and the TTL-TO-LVDS converter 110 outputs the LVDS signals IN0, IN1, and IN2 to be transmitted line by line through first to third buffers 130*a*, 130*b*, and 130*c*. And, the first PLL 120 converts the dot clock DCLK into the LVDS signal and transmits a clock signal CKIN through a fourth buffer 130*d*.

As described before, the LVDS transmission unit 12 of the present invention having the TTL-TO-LVDS converter 110, the first PLL 120, and the first to fourth buffers 130*a*~130*d* receives a 30 bit image data RGB through 30 TTL signal transmission lines, and receives the frame ratio setting signals OP1, OP2, the horizontal synchronizing signal Hsync, the vertical synchronizing signal Vsync, and the data enable signal DE through 5 TTL signal transmission lines.

And, the TTL-TO-LVDS converter 110 transmits the image data RGB and the control signals Vsync, Hsync, DE including the frame ratio setting signals converted into the LVDS signals through the first to third buffers 130*a*~130*c* provided to three output terminals respectively of the TTL-TO-LVDS converter 110 to the LVDS reception unit 14.

Figure 3:
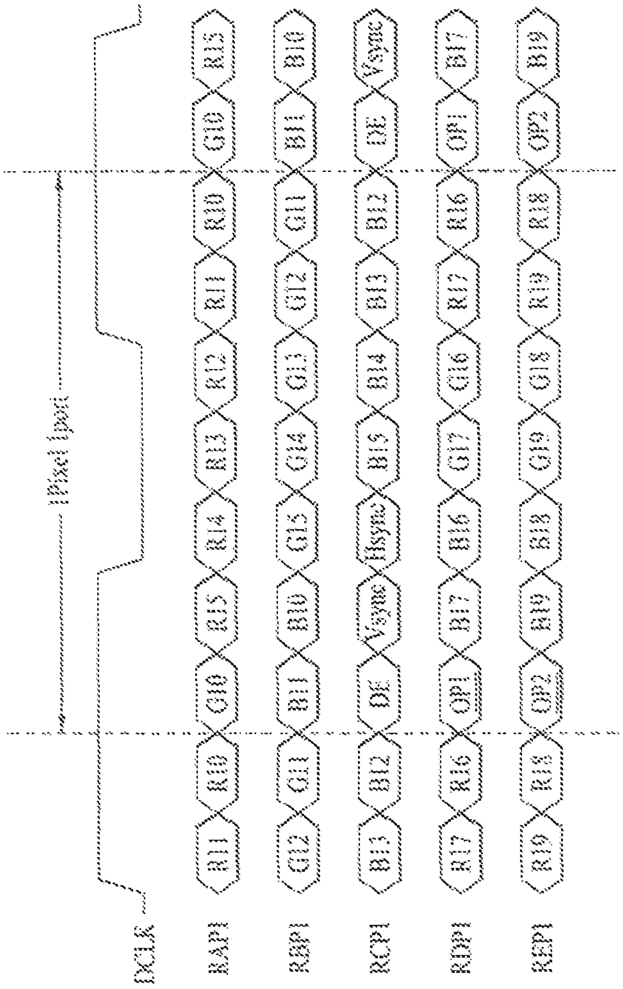
FIG. 3 illustrates a diagram showing LVDS data format information on each pixel in an LVDS transmission unit.

FIG. 3 illustrates a diagram showing LVDS data format information on each pixel in an LVDS transmission unit.

Referring to FIG. 3, an LVDS data format is set such that one port LVDS data on each pixel includes 30 bits of the image data RGB, 3 bits of the horizontal synchronizing signal Hsync, the vertical synchronizing signal Vsync, and the data enable signal DE, and 2 bits of the frame ratio setting signals OP1, OP2. According to this, the LVDS transmission unit 12 of the present invention converts 30 bits of the image data RGB, 3 bits of the horizontal synchronizing signal Hsync, the vertical synchronizing signal Vsync, and the data enable signal DE, and 2 bits of the frame ratio setting signals OP1, OP2 into an LVDS signal format and transmits the same as one port LVDS data.

Figure 4:
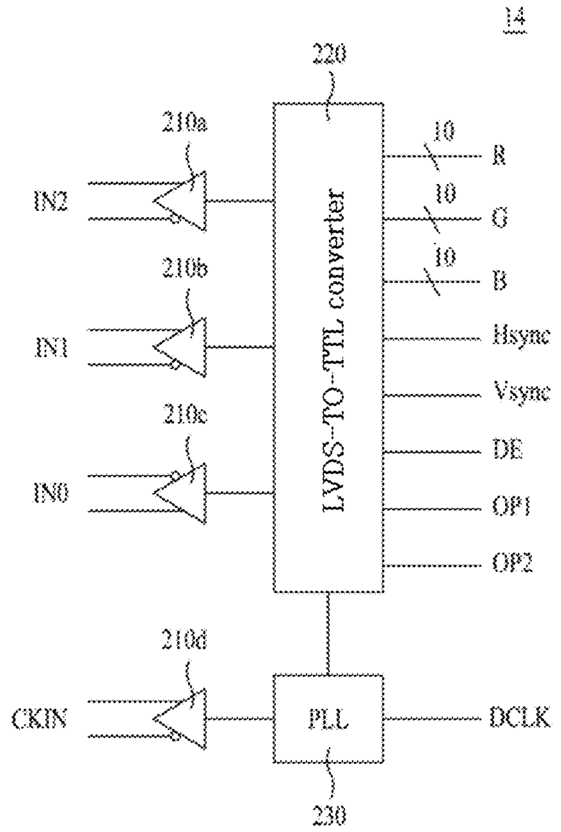
FIG. 4 illustrates a block diagram of the LVDS reception unit in FIG. 1.

FIG. 4 illustrates a block diagram of the LVDS reception unit in FIG. 1.

Referring to FIG. 4, the LVDS reception unit 14 converts the one port LVDS data on each pixel converted into the LVDS signal and transmitted thus, i.e., the image data RGB on each pixel and the plurality of control signals Vsync, Hsync, and DE including the frame ratio setting signals OP1, OP2 converted into the LVDS signal thus and supplied thus into the TTL signals, and supplies the same to the timing controller 8.

Referring to FIG. 4, the step the LVDS signal is converted into the TTL signal will be described. The LVDS signals including the image data transmitted through the IN0, IN1, and IN2 are received at the LVDS-TO-TTL converter 220 through fifth to seventh buffers 210*a*, 210*b*, and 210*c*, and the clock signal CKIN LVDS converted thus is also received at the second PPL 230 through the eighth buffer 210*d*. Then, the second PLL 230 provides a reference signal to the LVDS-TO-TTL converter 220 in a TTL signal, and the LVDS-TO-TTL converter 220 converts the LVDS signal received thus into the TTL signal, and forwards the same to a relevant transmission line. Then, in the TTL signals, the 30 bits of the image data, 3 bits of the controls signals, and the 2 bits of the frame ratio setting signals OP1, OP2 are transmitted through the TTL transmission line, and the dot clock DCLK is also transmitted through the TTL transmission line from the second PPL 230. In this instance, each of the LVDS transmission unit 12 and the LVDS reception unit 14 spreads a frequency of the reference clock CKIN generated thereby in a spread spectrum method to make a frequency band of the TTL signal wider to spread the frequency, for preventing energy from concentrating on a particular frequency band to exceed an EMI reference value, at the end.

As described before, the LVDS reception unit 14 having the LVDS-TO-TTL converter 220, the second PPL 230 and the fifth to eighth buffers 210*a*~210*d* receives the one port LVDS signals through the fifth to seventh buffers 210*a* to 210*c* provided to the three input terminals on the LVDS-TO-TTL converter 220. And, the LVDS reception unit 14 converts the one port LVDS signals on one pixel having 30 bits of the image data RGB, 3 bits of the horizontal synchronizing signal Hsync, the vertical synchronizing signal Vsync, and the data enable signal DE, and 2 bits of the frame ratio setting signals OP1, OP2 into the TTL signals, and supplies to the timing controller 8. According to this, the timing controller 8 makes control for driving the liquid crystal panel 2.

Figure 5:
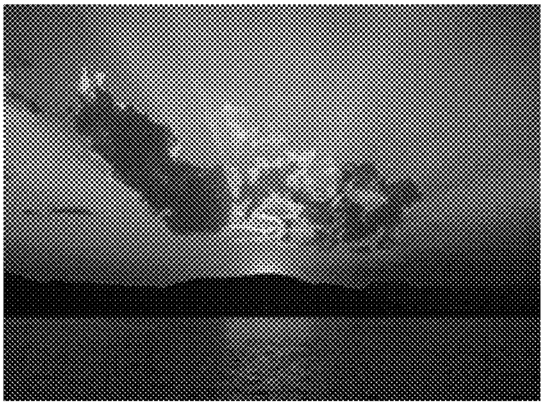
FIG. 5 illustrates an image displayed in a frame ratio of 16:9 according to a frame ratio setting signal.
Figure 6:
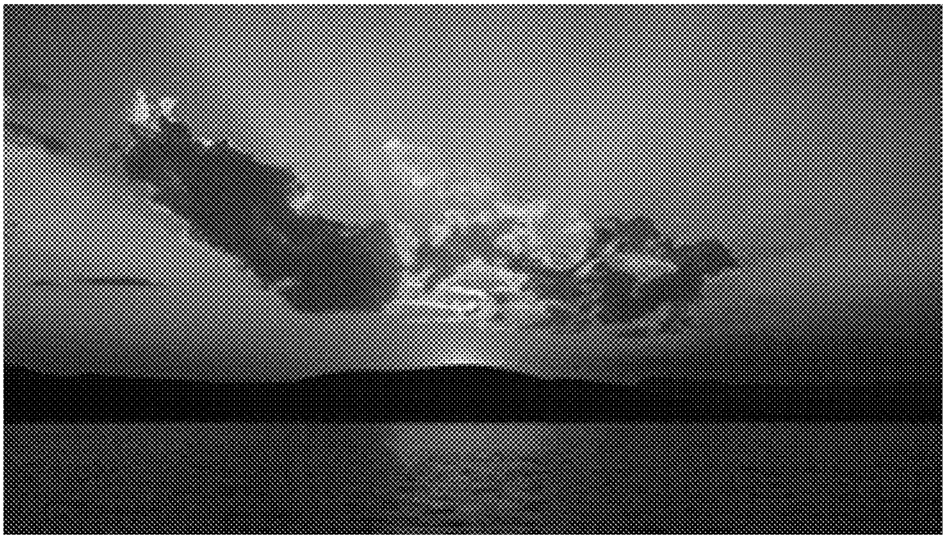
FIG. 6 illustrates an image displayed in a frame ratio of 21:9 according to a frame ratio setting signal.

FIG. 5 illustrates an image displayed in a frame ratio of 16:9 according to a frame ratio setting signal, and FIG. 6 illustrates an image displayed in a frame ratio of 21:9 according to a frame ratio setting signal.

As described before, the timing controller 8 sets and aligns the display frame ratio of the image data RGB according to the 2 bit frame ratio setting signals OP1, OP1 from the LVDS reception unit 14 and supplies the same to the data driver 4.

Referring to FIGS. 5 and 6, in a case the timing controller 8 receives the 2 bit frame ratio setting signals OP1, OP1 in "00" to display the image in a ratio of 16:9 which is a general frame display ratio, as shown in FIG. 5, the timing controller 8 aligns the image data RGB to fit to a size and drive of the liquid crystal panel 2, and supplies the image data aligned thus to the data driver 4. By selection of the user, if the timing controller 8 receives the 2 bit frame ratio setting signals OP1, OP1 in "1,1" to display the image in a ratio of 21:9 which is a movie show ratio, as shown in FIG. 5, the timing controller 8 aligns the image data RGB to display the image in the ratio of 21:9 and supplies the image data aligned thus to the data driver 4.

As has been described, the device and method for driving an image display device have the following advantages.

Additional transmission of the 2 bit frame ratio setting signals OP1, OP1 can also be made possible without increasing the signal transmission lines in an LVDS interface circuit, i.e., signal transmission ports between the LVDS transmission unit 12 and the LVDS reception unit 14. According to this, the additional transmission of the optional control signals, for an example, the frame ratio setting signals OP1, OP1, without increasing the LVDS interface circuit can provide more users' convenience.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A device for driving an image display device comprising:

an image display panel having a plurality of pixels for displaying an image;

a plurality of drivers for driving the image display panel;

a Low Voltage Differential Signaling (LVDS) transmission unit for converting an external image data and a plurality of control signals including frame ratio setting signals into LVDS signals and transmitting the same;

a LVDS reception unit for converting the image data and the plurality of control signals including frame ratio setting signals converted into the LVDS signals and transmitted thus into Transistor-Transistor Logic (TTL) signals and forwarding the same; and a timing controller for aligning the image data to fit to the display frame ratio according to the frame ratio setting signals and the plurality of control signals from the LVDS reception unit and supplying the same to the plurality of drivers, for displaying the image on the image display panel.

2. The device as claimed in claim 1, wherein the LVDS transmission unit converts 30 bits of the image data, 1 bit of a horizontal synchronizing signal, 1 bit of a vertical synchronizing signal, and 1 bit of a data enable signal, and 2 bits of the frame ratio setting signals into an LVDS signal format and transmits the same as 1 port LVDS data on one pixel, and the LVDS reception unit converts the 1 port LVDS data on one pixel into the TTL signals which are the 30 bits of the image data, 1 bit of a horizontal synchronizing signal, 1 bit of a vertical synchronizing signal, and 1 bit of a data enable signal, and 2 bits of the frame ratio setting signals and supplying the same to the timing controller.

3. The device as claimed in claim 2, wherein the LVDS transmission unit includes a TTL-TO-LVDS converter, a Phase Locked Loop (PLL), and first to fourth buffers, for receiving the 30 bits of the image data through 30 TTL transmission lines, and the frame ratio setting signal, the horizontal synchronizing signal, the vertical synchronizing signal, and the data enable signal through 5 TTL signal transmission lines, and transmitting the image data and the control signals including the frame ratio setting signals converted into the LVDS signals thus to the LVDS reception unit through first to third buffers provided to three output terminals on the TTL-TO-LVDS converter.

4. The device as claimed in claim 3, wherein the LVDS reception unit includes the LVDS-TO-TTL converter and a second PLL and fifth to eighth buffers for receiving the one port LVDS signals on one pixel through the fifth to seventh buffers provided to three input terminals on the LVDS-TO-TTL converter, for converting the one port LVDS signals on one pixel into TTL signals of 30 bits of the image data, 1 bits of a horizontal synchronizing signal, 1 bit of a vertical synchronizing signal, and 1 bit of a data enable signal, and 2 bits of the frame ratio setting signals and supplying the same to the timing controller.

5. A method for driving an image display device comprising:

converting an external image data and a plurality of control signals including frame ratio setting signals into LVDS signals and transmitting the same;

converting the image data and the plurality of control signals including the frame ratio setting signals converted into the LVDS signals and transmitted thus into TTL signals and forwarding the same; and aligning the image data to fit to the display frame ratio according to the frame ratio setting signal and the plurality of control signals and supplying the same to a plurality of drivers, for displaying the image on the image display panel.

6. The method as claimed in claim 5, wherein the step of converting the image data and the plurality of control signals including the frame ratio setting signals converted into the LVDS signals and transmitted thus into TTL signals and forwarding the same includes;

the step of converting 30 bits of the image data, 1 bit of a horizontal synchronizing signal, 1 bit of a vertical synchronizing signal, and 1 bit of a data enable signal, and 2 bits of the frame ratio setting signals into an LVDS signal format and transmitting the same as 1 port LVDS data on one pixel, and the step of aligning the image data to fit to the display frame ratio according to the frame ratio setting signal and the plurality of control signals and supplying the same to a plurality of drivers, for displaying the image on the image display panel includes;

the step of receiving and converting the 1 port LVDS data on one pixel transmitted thus into the TTL signals which are the 30 bits of the image data, 1 bit of a horizontal synchronizing signal, 1 bit of a vertical synchronizing signal, and 1 bit of a data enable signal, and 2 bits of the frame ratio setting signals.

7. The method as claimed in claim 6, wherein the step of converting the image data and the plurality of control signals including the frame ratio setting signals converted into the LVDS signals and transmitted thus into TTL signals and forwarding the same includes;

the step of using a LVDS-TO-TTL converter, a PLL, and first to fourth buffers, for receiving the 30 bits of the image data through 30 TTL transmission lines, and the frame ratio setting signal, the horizontal synchronizing signal, the vertical synchronizing signal, and the data enable signal through 5 TTL signal transmission lines, and transmitting the image data and the control signals including the frame ratio setting signal converted into the LVDS signals thus to the LVDS reception unit through first to third buffers provided to three output terminals on the TTL-TO-LVDS converter.

8. The method as claimed in claim 7, wherein the step of aligning the image data to fit to the display frame ratio according to the frame ratio setting signal and the plurality of control signals and supplying the same to a plurality of drivers, for displaying the image on the image display panel includes;

the step of providing the LVDS-TO-TTL converter, a second PLL and fifth to eighth buffers, for receiving the one port LVDS signals on one pixel through the fifth to seventh buffers provided to three input terminals on the LVDS-TO-TTL converter, and converting the one port LVDS signals on one pixel into TTL signals of 30 bits of the image data, 1 bit of a horizontal synchronizing signal, 1 bit of a vertical synchronizing signal, and 1 bit of a data enable signal, and 2 bits of the frame ratio setting signals and forwarding the same.

* * * * *